United States Patent
Wu et al.

(10) Patent No.: US 8,854,340 B2
(45) Date of Patent: Oct. 7, 2014

(54) TOUCH DEVICE WITH FORCE FEEDBACK FUNCTION

(75) Inventors: Wei-Hung Wu, Hsin-Chu (TW);
Hung-Chuo Lee, Hsin-Chu (TW);
Kuan-Fu Huang, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 448 days.

(21) Appl. No.: 13/222,031

(22) Filed: Aug. 31, 2011

(65) Prior Publication Data
US 2012/0050199 A1    Mar. 1, 2012

(30) Foreign Application Priority Data

Sep. 1, 2010   (TW) ............................... 99129557 A

(51) Int. Cl.
*G06F 3/043* (2006.01)
(52) U.S. Cl.
USPC .................... 345/177; 345/174; 178/18.04
(58) Field of Classification Search
CPC ..... G06F 3/043; G06F 3/0433; G06F 3/0436; G06F 3/041
USPC ............... 345/173–179; 178/18.01–18.09, 178/20.01–20.04
See application file for complete search history.

(56) References Cited

U.S. PATENT DOCUMENTS

| | | | |
|---|---|---|---|
| 6,225,986 B1* | 5/2001 | Sato et al. | 345/178 |
| 2007/0204697 A1 | 9/2007 | Watanabe et al. | |
| 2008/0161065 A1 | 7/2008 | An et al. | |
| 2010/0238116 A1* | 9/2010 | Shin | 345/168 |
| 2010/0328053 A1* | 12/2010 | Yeh et al. | 340/407.2 |
| 2011/0291954 A1* | 12/2011 | Djavaherian | 345/173 |

FOREIGN PATENT DOCUMENTS

| | | |
|---|---|---|
| CN | 101035394 | 9/2007 |
| CN | 101232673 | 7/2008 |
| JP | 2005258666 | 9/2005 |
| JP | 2006215738 | 8/2006 |
| JP | 2007034954 | 2/2007 |
| JP | 2009211417 | 9/2009 |

* cited by examiner

Primary Examiner — Vijay Shankar
(74) Attorney, Agent, or Firm — WPAT, PC; Justin King

(57) ABSTRACT

A touch device includes a touch sensing unit, a vibrator and a vibration transmitting unit. The vibrator is used for generating vibration energy. The vibration transmitting unit is installed on a backside of the touch sensing unit and connected with the vibrator for transmitting the vibration energy to the touch sensing unit. The vibration transmitting unit includes a vibration-homogenizing plate. The rigidity of the vibration-homogenizing plate decreases as the distance from the vibrator increases.

17 Claims, 6 Drawing Sheets

TOUCH DEVICE WITH FORCE FEEDBACK FUNCTION

FIELD OF THE INVENTION

The present invention relates to a touch device, and more particularly to a touch device with a force feedback function and having a mechanism for homogenizing the vibration energy.

BACKGROUND OF THE INVENTION

Nowadays, touch panel displays have experienced great growth and are now rapidly gaining in popularity. Consequently, a variety of touch feedback devices have been developed. The feedback may be in diversified forms such as sound effect feedback, visual effect feedback or the like. The feedback creates virtual reality interaction between the computer system and the user.

Generally, force feedback is one kind of touch feedback. FIG. 1 is a schematic diagram illustrating the architecture of a touch panel display with a force feedback function according to the prior art. An actuator 11 (e.g. a motor or a vibrator) is arranged at a periphery of a touch panel display 10. During operation of the touch panel display 10, a control signal is transmitted to a host 19. In response to the control signal, a feedback signal is transmitted from the host 19 to actuator 11. In response to the feedback signal, the actuator 11 is enabled to generate vibration energy. In such way, the user may feel vibration of the touch panel display 10 and accurately realize the conditions of inputting instructions.

As the area of the touch panel display 10 increases, the vibration energy generated by the actuator 11 fails to be uniformly transmitted to all regions of the touch panel display 10. For increasing sufficient force feedback, it is necessary to use more actuators 11 or change the vibration frequency of the actuators 11. Under this circumstance, the power consumption, the volume and the fabricating cost are increased.

Therefore, there is a need of providing an improved touch device with a force feedback function to obviate the drawbacks encountered from the prior art.

SUMMARY OF THE INVENTION

Therefore, the object of the present invention is to provide a touch device with a force feedback function and having a mechanism for homogenizing the vibration energy.

In accordance with an embodiment of the present invention, a touch device is disclosed. The touch device includes a touch sensing unit, a vibrator and a vibration transmitting unit. The vibrator is used for generating vibration. The vibration transmitting unit is installed on a backside of the touch sensing unit and connected with the vibrator for transmitting the vibration to the touch sensing unit. The vibration transmitting unit includes a vibration-homogenizing plate. The rigidity of the vibration-homogenizing plate decreases as the distance from the vibrator increases.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
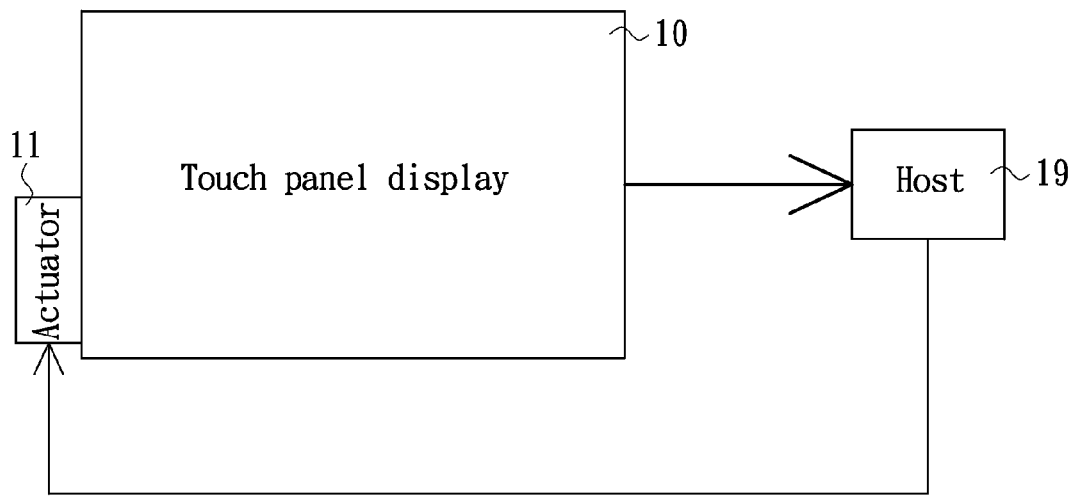
FIG. 1 is a schematic diagram illustrating the architecture of a touch panel display with a force feedback function according to the prior art.
Figure 2:
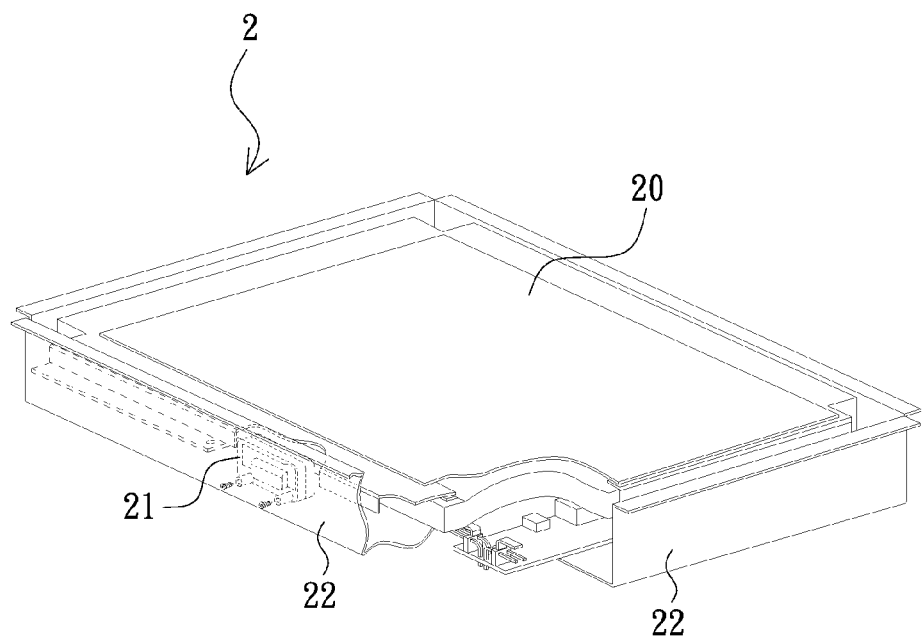
FIG. 2 is a schematic diagram illustrating a touch device with a force feedback function according to an embodiment of the present invention.

FIG. 2 is a schematic diagram illustrating a touch device with a force feedback function according to an embodiment of the present invention. As shown in FIG. 2, the touch device 2 comprises a touch sensing unit 20, a vibrator 21 and a vibration transmitting unit 22. The touch sensing unit 20 is used for sensing a user's touching action, thereby generating a control signal. An example of the touch sensing unit 20 includes but is not limited to a touch panel or a touch panel display.

The vibrator 21 is in communication with the touch sensing unit 20. In response to the control signal, the vibrator 21 generates vibration. An example of the vibrator 21 includes but is not limited to a vibrating motor or a piezoceramic actuator.

The vibration transmitting unit 22 is installed on the backside of the touch sensing unit 20, and connected with the vibrator 21. Through the vibration transmitting unit 22, the vibration generated by the vibrator 21 may be transmitted to the touch sensing unit 20. Consequently, when the touch device is operated by the user, the force feedback may be felt by the user. It is noted that other components (e.g. a backlight module) may be arranged between the vibration transmitting unit 22 and the touch sensing unit 20. In other words, it is not necessary to directly connect the vibration transmitting unit 22 with the touch sensing unit 20. Alternatively, the vibration transmitting unit 22 may be installed on the backside of the touch sensing unit 20 and indirectly connected with the touch sensing unit 20 through other component.

Hereinafter, an exemplary vibration transmitting unit 22 used in the touch device 2 will be illustrated with reference to FIG. 3.

Figure 3:
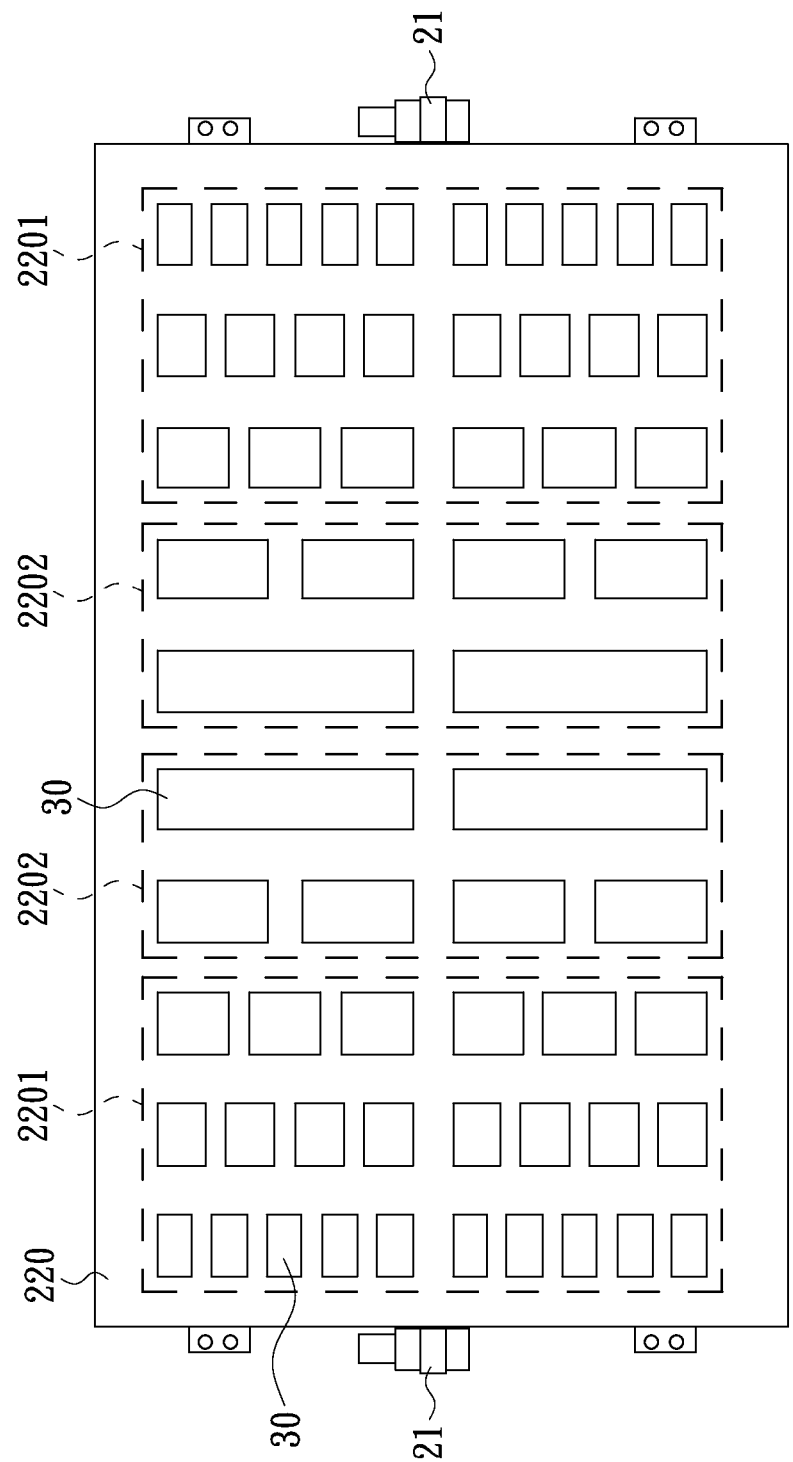
FIG. 3 is a schematic diagram illustrating a first exemplary vibration-homogenizing plate of a vibration transmitting unit used in the touch device of the embodiment of the present invention.

As shown in FIG. 3, the vibration transmitting unit 22 includes a vibration-homogenizing plate 220. For example, in a case that the touch device is a flat display, the vibration-homogenizing plate 220 is a metallic backside cover of the flat display. In order to homogenize the vibration energy, the rigidity of the vibration-homogenizing plate 220 decreases as the distance from the vibrator 21 increases. For example, the vibrators 21 are arranged at the periphery of the vibration-homogenizing plate 220. In the embodiment of FIG. 3, the vibrators 21 are arranged at bilateral edges of the vibration-homogenizing plate 220. The vibration-homogenizing plate 220 comprises a first zone 2201 and a second zone 2202. The first zone 2201 is closer to the vibrator 21 than the second zone 2202. In addition, the vibration-homogenizing plate 220 comprises plural machined structures (e.g. openings 30) with different areas. The distribution density of the openings 30 in the first zone 2201 is lower than the distribution density of the openings 30 in the second zone 2202. In addition, the area of the opening 30 increase as the distance from the vibrator 21 increases. In such way, the rigidity of the vibration-homogenizing plate 220 decreases as the distance from the vibrator 21 increases. Consequently, the vibration energy is homogenized by means of the vibration-homogenizing plate 220. In the context, the distribution density of the openings 30 is equal to a ratio of the total area of the openings 30 in a specified zone (e.g. the first zone 2201 or the second zone 2202) to the area of the specified zone (e.g. the first zone 2201 or the second zone 2202) of the vibration-homogenizing plate 220. That is, the ratio of the total area of the openings 30 in the first zone 2201 to the area of the first zone 2201 is lower than the ratio of the total area of the openings 30 in the second zone 2202 to the area of the second zone 2202.

In the embodiment of FIG. 3, the areas of the openings 30 are not completely identical, and the area of the opening 30 increase as the distance from the vibrator 21 increases. It is noted that numerous modification and alteration may be made as long as the distribution density of the openings 30 in the first zone 2201 is lower than the distribution density of the opening 30 in the second zone 2202.

Figure 4:
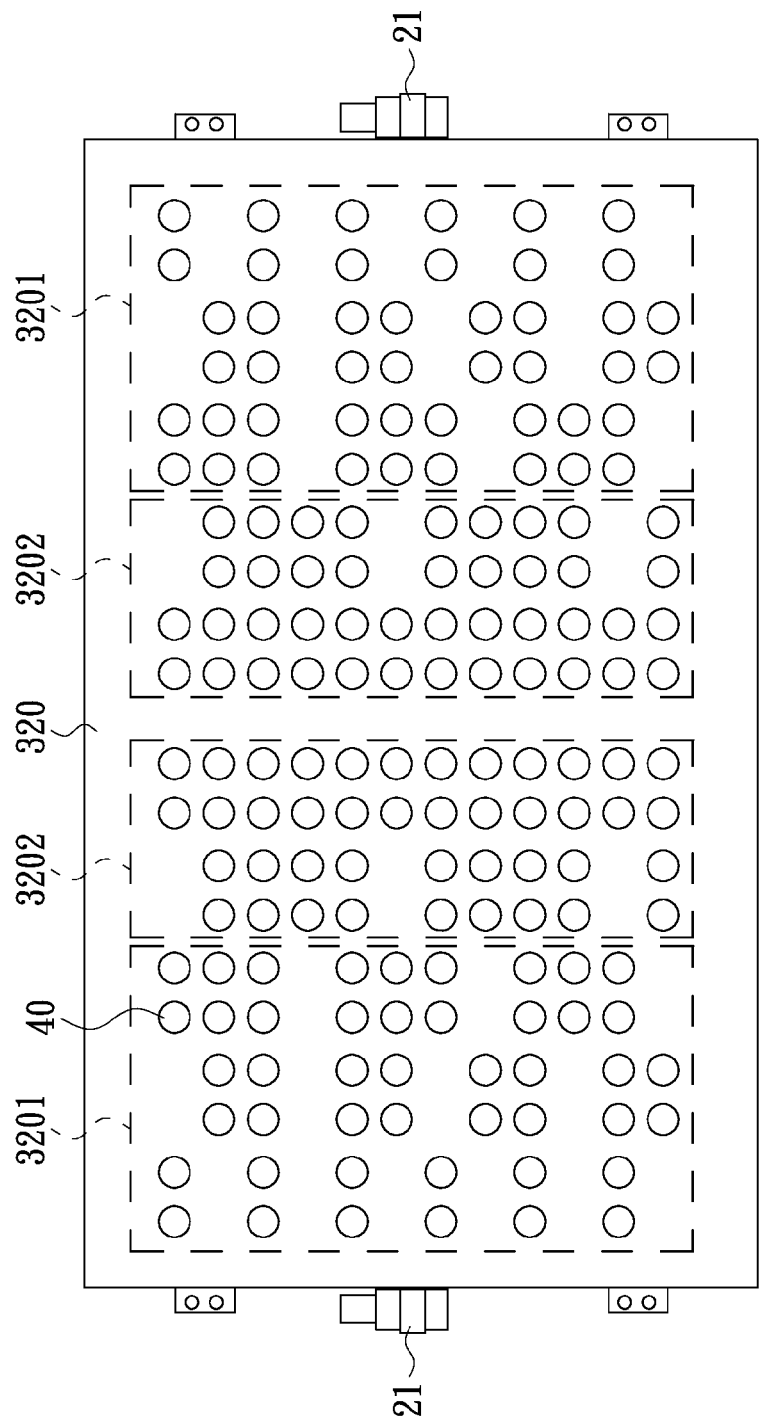
FIG. 4 is a schematic diagram illustrating a second exemplary vibration-homogenizing plate of a vibration transmitting unit used in the touch device of the embodiment of the present invention.

Another exemplary vibration-homogenizing plate of the vibration transmitting unit 22 will be illustrated with reference to FIG. 4. As shown in FIG. 4, the vibrators 21 are arranged at the periphery (e.g. the bilateral edges) of the vibration-homogenizing plate 320. The vibration-homogenizing plate 320 comprises a first zone 3201 and a second zone 3202, wherein the first zone 3201 is closer to the vibrator 21 than the second zone 3202. In addition, the vibration-homogenizing plate 320 comprises plural openings 40 with identical areas. Similarly, the distribution density of the openings 40 in the first zone 3201 is lower than the distribution density of the opening 40 in the second zone 3202. In addition, the number of the opening 40 per unit area increases as the distance from the vibrator 21 increases. In such way, the rigidity of the vibration-homogenizing plate 320 decreases as the distance from the vibrator 21 increases. Consequently, the vibration energy is homogenized by means of the vibration-homogenizing plate 320. In the context, the distribution density of the openings 40 is equal to a ratio of the total area of the openings 40 in a specified zone (e.g. the first zone 3201 or the second zone 3202) to the area of the specified zone of the vibration-homogenizing plate 320. That is, the ratio of the total area of the openings 40 in the first zone 3201 to the area of the first zone 3201 is lower than the ratio of the total area of the openings 40 in the second zone 3202 to the area of the second zone 3202.

In the embodiment of FIG. 4, the areas of the openings 40 are identical, and the number of the openings 40 per unit area increases as the distance from the vibrator 21 increases. It is noted that numerous modification and alteration may be made as long as the distribution density of the openings 40 in the first zone 3201 is lower than the distribution density of the openings 40 in the second zone 3202.

Figure 5A:
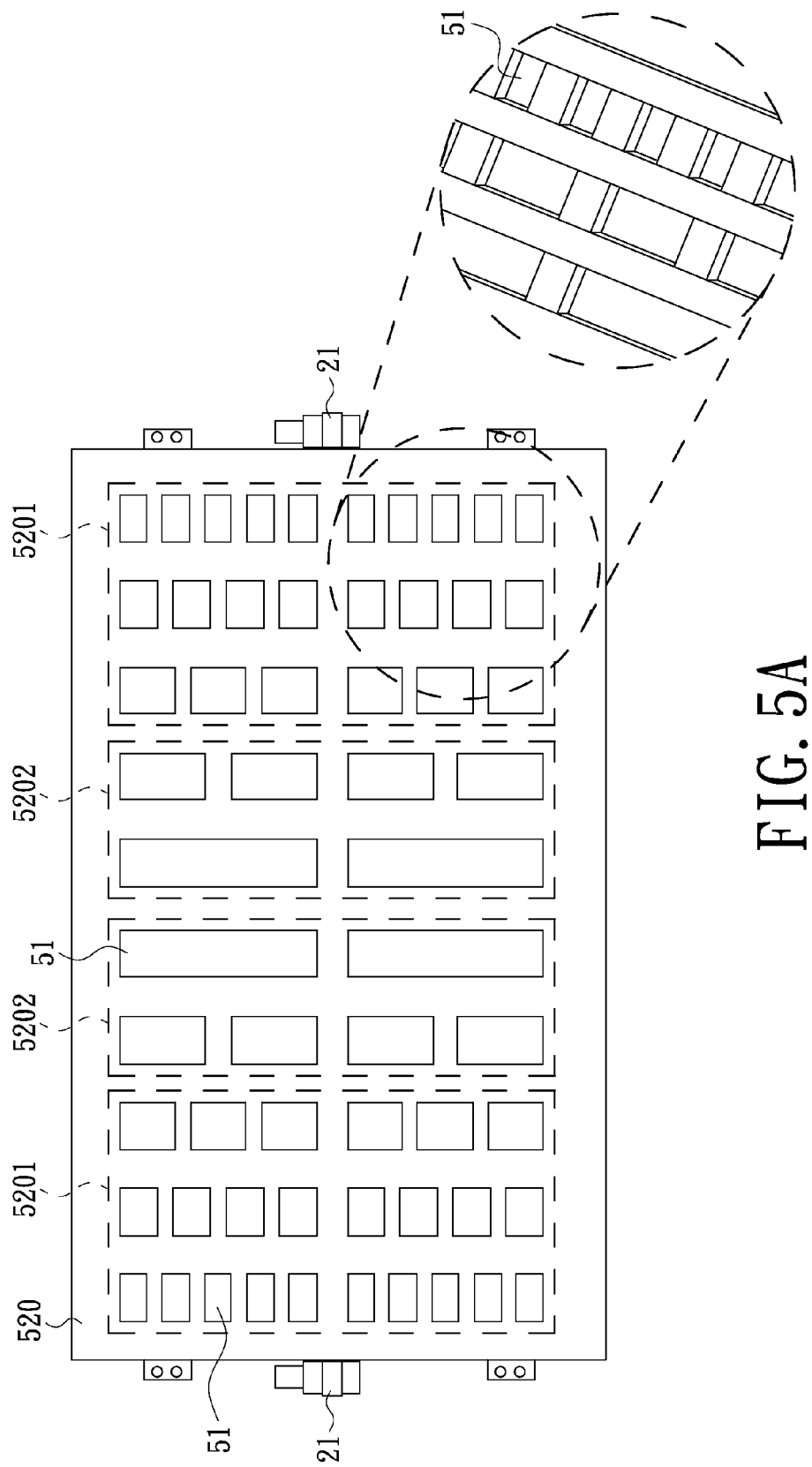
FIG. 5A is a schematic diagram illustrating a third exemplary vibration-homogenizing plate of a vibration transmitting unit used in the touch device of the embodiment of the present invention.

Hereinafter, other exemplary vibration-homogenizing plates of the vibration transmitting unit 22 will be illustrated with reference to FIGS. 5A and 5B. In these embodiments, the openings 30 and 40 described in the above embodiments may be replaced by plural indentations 51 and 52. In FIG. 5A, the vibrators 21 are arranged at the periphery (e.g. the bilateral edges) of the vibration-homogenizing plate 520. The vibration-homogenizing plate 520 comprises a first zone 5201 and a second zone 5202, wherein the first zone 5201 is closer to the vibrator 21 than the second zone 5202. In addition, the vibration-homogenizing plate 520 comprises plural indentations 51 with different areas. Since the indentations 51 are produced by punching a top surface of metal plate, the vibration-homogenizing plate 520 may be also considered to have plural punched bulges on a bottom surface of the metal plate. The distribution density of the indentations 51 in the first zone 5201 is lower than the distribution density of the indentations 51 in the second zone 5202. In addition, the areas of the indentations 51 increase as the distance from the vibrator 21 increases. In such way, the rigidity of the vibration-homogenizing plate 520 decreases as the distance from the vibrator 21 increases. Consequently, the vibration energy is homogenized by means of the vibration-homogenizing plate 520.

Figure 5B:
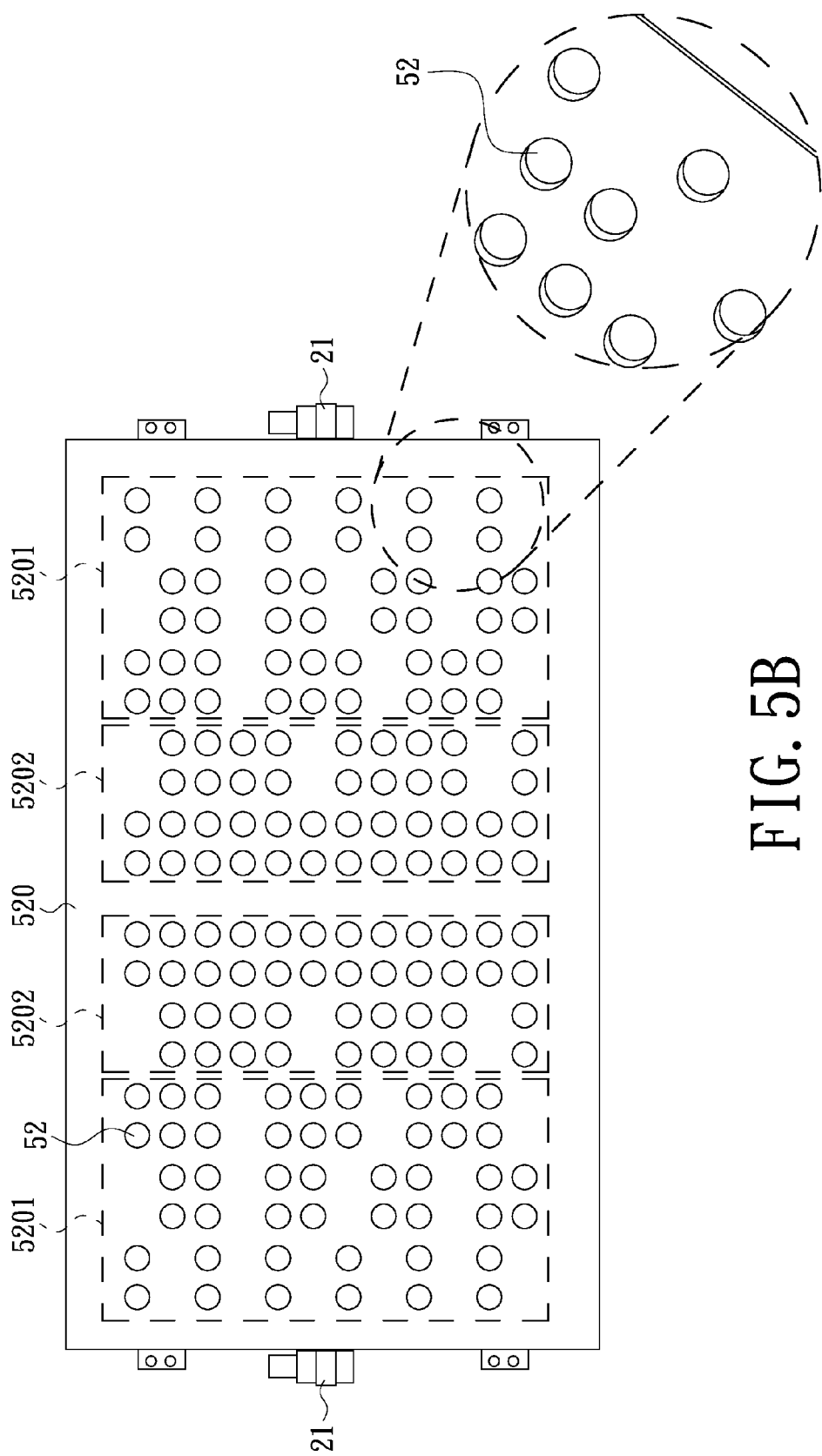
FIG. 5B is a schematic diagram illustrating a fourth exemplary vibration-homogenizing plate of a vibration transmitting unit used in the touch device of the embodiment of the present invention.

In FIG. 5B, the vibrators 21 are also arranged at the periphery (e.g. the bilateral edges) of the vibration-homogenizing plate 520. The vibration-homogenizing plate 520 comprises a first zone 5201 and a second zone 5202, wherein the first zone 5201 is closer to the vibrator 21 than the second zone 5202. In addition, the vibration-homogenizing plate 520 comprises plural indentations 52 with identical areas. The distribution density of the indentations 52 in the first zone 5201 is lower than the distribution density of the indentations 52 in the second zone 5202. In addition, the number of the indentations 52 per unit area increases as the distance from the vibrator 21 increases. In such way, the rigidity of the vibration-homogenizing plate 520 decreases as the distance from the vibrator 21 increases. Consequently, the vibration energy is homogenized by means of the vibration-homogenizing plate 520.

Figure 6:
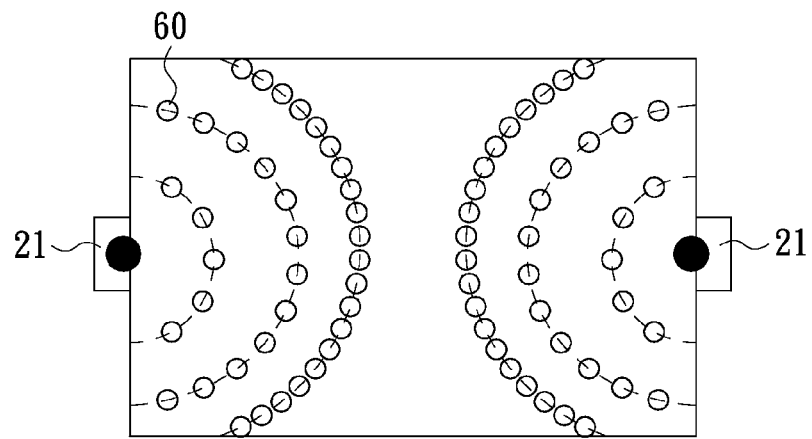
FIG. 6 is a schematic diagram illustrating a fifth exemplary vibration-homogenizing plate of a vibration transmitting unit used in the touch device of the embodiment of the present invention.

It is noted that numerous modifications and alterations of the machined structures may be made while retaining the teachings of the invention. As shown in FIG. 6, the machined structures 60 may be openings or indentations (or punched bulges). These machined structures 60 are discretely arranged in several concentric circles with the vibrator 21 serving as a center. Similarly, the distribution density of the machined structures 60 increases as the distance from the vibrator 21 increases. In this embodiment, the number of the machined structures 60 per unit area increase as the distance from the vibrator 21 increases, and the areas of the machined structures 60 are identical. It is noted that the areas of the machined structures 60 may be different, wherein the areas of the machined structures 60 increase as the distance from the vibrator 21 increases.

Figure 7:
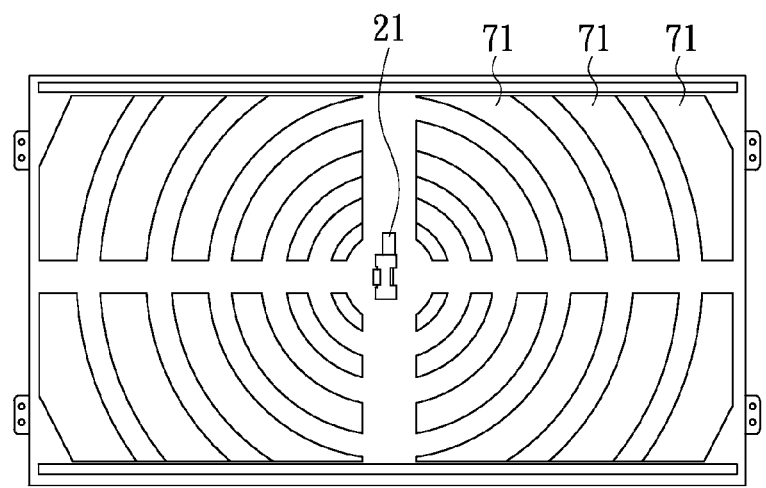
FIG. 7 is a schematic diagram illustrating a sixth exemplary vibration-homogenizing plate of a vibration transmitting unit used in the touch device of the embodiment of the present invention.

It is of course that the vibrator 21 may be arranged at the middle portion of the vibration-homogenizing plate of the vibration transmitting unit. Similarly, according to a specific design, the rigidity of the vibration-homogenizing plate decreases as the distance from the vibrator increases. As shown in FIG. 7, the openings 71 of the vibration-homogenizing plate are discretely arranged in several concentric circles with the vibrator 21 serving as a center. The openings 71 of the vibration-homogenizing plate have different areas. The areas of the openings 71 increase as the distance from the vibrator 21 increases. Alternatively, the openings 71 may be replaced with indentations. In some embodiments, the areas of the openings or indentations of the vibration-homogenizing plate are identical, and the number of the openings or indentations per unit area increases as the distance from the vibrator 21 increases.

In the above embodiments, the machined structures (e.g. openings or indentations) of the vibration-homogenizing plate are arranged in a specified manner, so that the rigidity of the vibration-homogenizing plate decreases as the distance from the vibrator increases. Alternatively, the rigidity of the vibration-homogenizing plate may be adjusted by forming patterned films on the vibration-homogenizing plate.

From the above description, the vibration energy generated by the actuator may be uniformly transmitted to all corners of the touch panel display according to the present invention. In such way, sufficient force feedback is created without the need of using too many actuators or changing the vibration frequency of the actuators. As a consequence, the touch device can meet the power-saving requirements and the volume and fabricating cost will be reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch device, comprising:
   a touch sensing unit;
   a vibrator for generating vibration; and
   a vibration transmitting unit installed on a backside of the touch sensing unit and connected with the vibrator for transmitting the vibration to the touch sensing unit, wherein the vibration transmitting unit comprises a vibration-homogenizing plate, and the rigidity of the vibration-homogenizing plate decreases as the distance from the vibrator increases;
   wherein the vibration-homogenizing plate is a metallic backside cover with plural machined structures, the metallic backside cover has a first zone close to the vibrator and a second zone distant from the vibrator, the distribution density of the machined structures in the first zone is lower than the distribution density of the machined structures in the second zone.

2. The touch device according to claim 1, wherein the touch sensing unit is a touch panel or a touch panel display.

3. The touch device according to claim 1, wherein the vibrator is a vibrating motor or a piezoceramic actuator.

4. The touch device according to claim 1, wherein the vibrator is arranged at a middle portion of the vibration transmitting unit.

5. The touch device according to claim 1, wherein the vibrator is arranged at a periphery of the vibration transmitting unit.

6. The touch device according to claim 1, wherein the machined structures are openings or indentations.

7. The touch device according to claim 1, wherein the areas of the machined structures are identical, and the number of the machined structures per unit area of the metallic backside cover increases as the distance from the vibrator increases.

8. The touch device according to claim 1, wherein the areas of the machined structures are different, and the areas of the machined structures increases as the distance from the vibrator increases.

9. The touch device according to claim 1, wherein the machined structures are discretely arranged in several concentric circles with the vibrator serving as a center.

10. A touch device, comprising:
    a touch sensing unit;
    a vibrator for generating vibration; and
    a vibration transmitting unit installed on a backside of the touch sensing unit and connected with the vibrator for transmitting the vibration to the touch sensing unit, wherein the vibration transmitting unit comprises a vibration-homogenizing plate with plural machined structures, and the distribution density of the machined structures increases as the distance from the vibrator increases;
    wherein the areas of the machined structures are identical, and the number of the machined structures per unit area of the metallic backside cover increases as the distance from the vibrator increases.

11. The touch device according to claim 10, wherein the vibrator is a vibrating motor or a piezoceramic actuator.

12. The touch device according to claim 10, wherein the vibrator is arranged at a middle portion of the vibration transmitting unit.

13. The touch device according to claim 10, wherein the vibrator is arranged at a periphery of the vibration transmitting unit.

14. The touch device according to claim 10, wherein the vibration-homogenizing plate is a metallic backside cover.

15. The touch device according to claim 10, wherein the machined structures are openings or indentations.

16. A touch device, comprising:
    a touch sensing unit;
    a vibrator for generating vibration; and
    a vibration transmitting unit installed on a backside of the touch sensing unit and connected with the vibrator for transmitting the vibration to the touch sensing unit, wherein the vibration transmitting unit comprises a vibration-homogenizing plate with plural machined structures, and the distribution density of the machined structures increases as the distance from the vibrator increases;
    wherein the areas of the machined structures are different, and the areas of the machined structures increases as the distance from the vibrator increases.

17. The touch device according to claim 10, wherein the machined structures are discretely arranged in several concentric circles with the vibrator serving as a center.

* * * * *